United States Patent
Kim et al.

(10) Patent No.: US 10,887,922 B2
(45) Date of Patent: Jan. 5, 2021

(54) METHOD FOR EFFECTIVELY TRANSMITTING CONTROL MESSAGE FOR RANDOM ACCESS

(71) Applicant: Samsung Electronics Co., Ltd., Suwon-si (KR)

(72) Inventors: Yohan Kim, Yongin-si (KR); Jaewon Kim, Seoul (KR); Daeyoung Seol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/316,208

(22) PCT Filed: Jul. 10, 2017

(86) PCT No.: PCT/KR2017/007367
§ 371 (c)(1),
(2) Date: Jan. 8, 2019

(87) PCT Pub. No.: WO2018/012833
PCT Pub. Date: Jan. 18, 2018

(65) Prior Publication Data
US 2019/0327768 A1  Oct. 24, 2019

Related U.S. Application Data

(60) Provisional application No. 62/360,621, filed on Jul. 11, 2016.

(30) Foreign Application Priority Data

Apr. 25, 2017 (KR) .................. 10-2017-0052805

(51) Int. Cl.
*H04W 74/08* (2009.01)
*H04W 76/11* (2018.01)
(Continued)

(52) U.S. Cl.
CPC ....... *H04W 74/0833* (2013.01); *H04L 1/1819* (2013.01); *H04L 5/0055* (2013.01);
(Continued)

(58) Field of Classification Search
None
See application file for complete search history.

(56) References Cited

U.S. PATENT DOCUMENTS

2010/0296467 A1  11/2010  Pelletier et al.
2012/0300714 A1  11/2012  Ng et al.
(Continued)

FOREIGN PATENT DOCUMENTS

| KR | 10-1216751 B1 | 12/2012 |
| KR | 10-2013-0087308 A | 8/2013 |
| KR | 10-2015-0052354 A | 5/2015 |

OTHER PUBLICATIONS

CISCO, 'Verizon 5G TF;Air Interface Working Group;Verizon 5th Generation Radio Access; Physical layer procedures (Release 1)', p. 1-43, Section 3.2, 5.3, 8.1, 8.3, 8.3.4, 12.2, (http://5gtf.net/V5G_213_v1p0.pdf), Jun. 2016.

(Continued)

*Primary Examiner* — Anh Ngoc M Nguyen
(74) *Attorney, Agent, or Firm* — Jefferson IP Law, LLP

(57) ABSTRACT

The present disclosure relates to a communication technique for convergence of a 5G communication system for supporting a higher data transmission rate beyond a 4G system with an IoT technology, and a system therefor. The present disclosure may be applied to an intelligent service (for example, smart home, smart building, smart city, smart car or connected car, health care, digital education, retail business, security and safety-related service, etc.) on the basis of a 5G communication technology and an IoT-related technology. The present disclosure relates to a method and
(Continued)

device for effectively transmitting or receiving control information for random access in a communication system. According to various embodiments of the present invention, information related to initial random access can be effectively transmitted and received.

13 Claims, 9 Drawing Sheets

(51) Int. Cl.
  *H04L 1/18* (2006.01)
  *H04L 5/00* (2006.01)
  *H04W 72/04* (2009.01)
  *H04W 88/02* (2009.01)
  *H04W 88/10* (2009.01)

(52) U.S. Cl.
  CPC .......... *H04W 72/042* (2013.01); *H04W 76/11* (2018.02); *H04W 88/023* (2013.01); *H04W 88/10* (2013.01)

(56) References Cited

U.S. PATENT DOCUMENTS

2014/0086193 A1\* 3/2014 Suzuki .................. H04W 52/50
  370/329
2015/0282158 A1 10/2015 Chen et al.
2016/0029425 A1 1/2016 Jang et al.

OTHER PUBLICATIONS

Extended European Search Report dated Apr. 23, 2019, issued in a counterpart European application No. 17827904.8-1215/3471490.
Samsung: "DCI Formats", 3GPP Draft; R1-156748 DCI Formats, 3rd Generation Partnership Project (3GPP), Mobile Competence Centre; 650, Route Des Lucioles ; F-06921 Sophia-Antipolis Cedex ; France, vol. RAN WG1, No. Anaheim, USA; Nov. 16, 2015-Nov. 20, 2015; Nov. 15, 2015, XP051003128; URL:http://www.3gpp.org/ftp/Meetings_3GPP_SYNC/RAN1/Docs/.
CATT: "Remaining issues on random access for Rel-13 MTC", 3GPP Draft; R1-156565, 3rd Generation Partnership Project (3GPP), Mobile Competence Centre; 650, Route Des Lucioles ; F-06921 Sophia-Antipolis Cedex ; France, vol. RAN WG1, No. Anaheim, USA; Nov. 15, 2015-Nov. 22, 2015; Nov. 15, 2015, XP051002988; URL:http://www.3gpp.org/ftp/Meetings_3GPP_SYNC/RAN1/Docs/.

\* cited by examiner

METHOD FOR EFFECTIVELY TRANSMITTING CONTROL MESSAGE FOR RANDOM ACCESS

TECHNICAL FIELD

The present disclosure relates to a wireless communication system. More specifically, the present disclosure relates to a method and apparatus for effectively transmitting and receiving control information for random access in a communication system.

BACKGROUND ART

In order to satisfy a wireless data traffic demand that tends to increases after the 4G communication system commercialization, efforts to develop an improved 5G communication system or pre-5G communication system is being made. For this reason, the 5G communication system or pre-5G communication system is called a beyond 4G network communication system or a post LTE system. In order to achieve a high data transfer rate, the 5G communication system is considered to be implemented in an mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beamforming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

Meanwhile, the random access operation of a terminal in a mobile communication system has a problem in that the ambiguity of the operation may occur in random access message transmission.

DISCLOSURE OF INVENTION

Technical Problem

Various embodiments of the present disclosure have been made to solve at least some of problems, such as those described above, and propose a method and apparatus for effectively transmitting a control message for random access in a wireless communication system.

More specifically, there are proposed a message transmission method and apparatus for random access, which can remove the ambiguity of a random access-related standard of mobile communication, such as the non-presence of a DL grant not including hybrid automatic repeat and request (HARQ) transmission information, the non-presence of indication supporting asynchronous UL HARQ, and asymmetrical UL grant contents between an RAR and common uplink data in a mobile communication system.

Solution to Problem

A communication method of a base station in a wireless communication system according to an embodiment of the present disclosure may include receiving, from a terminal, a random access message; determining a response message in response to the random access message and downlink control information related to the response message; and transmitting, to the terminal, the determined response message and the determined downlink control information. Given information included in the downlink control information may be configured as a preset value.

A communication method of a terminal in a wireless communication system according to an embodiment of the present disclosure may include transmitting, to a base station, a message for random access; receiving, from the base station, downlink control information corresponding to the message for random access; receiving a response message by interpreting the downlink control information without considering a value of given information included in the downlink control information; and transmitting, to the base station, a terminal identification message based on the response message. The given information included in the terminal identification message may be configured as a preset value.

A base station for performing communication in a wireless communication system according to an embodiment of the present disclosure may include a transceiver configured to transmit and receive signals and a controller configured to control the transceiver to receive, from a terminal, a random access message, determine a response message in response to the random access message and downlink control information related to the response message, and control the transceiver to transmit the determined response message and the determined downlink control information. Given information included in the downlink control information may be configured as a preset value.

A terminal for performing communication in a wireless communication system according to an embodiment of the present disclosure may include a transceiver configured to transmit and receive signals and a controller configured to control the transceiver to transmit, to a base station, a message for random access, control the transceiver to receive, from the base station, downlink control information corresponding to the message for random access, control the transceiver to receive a response message by interpreting the downlink control information without considering a value of given information included in the downlink control information, and control the transceiver to transmit, to the base station, a terminal identification message based on the response message. The given information included in the terminal identification message may be configured as a preset value.

Advantageous Effects of Invention

In accordance with various embodiments of the present disclosure, information related to initial random access can be effectively transmitted and received.

MODE FOR THE INVENTION

Figure 1:
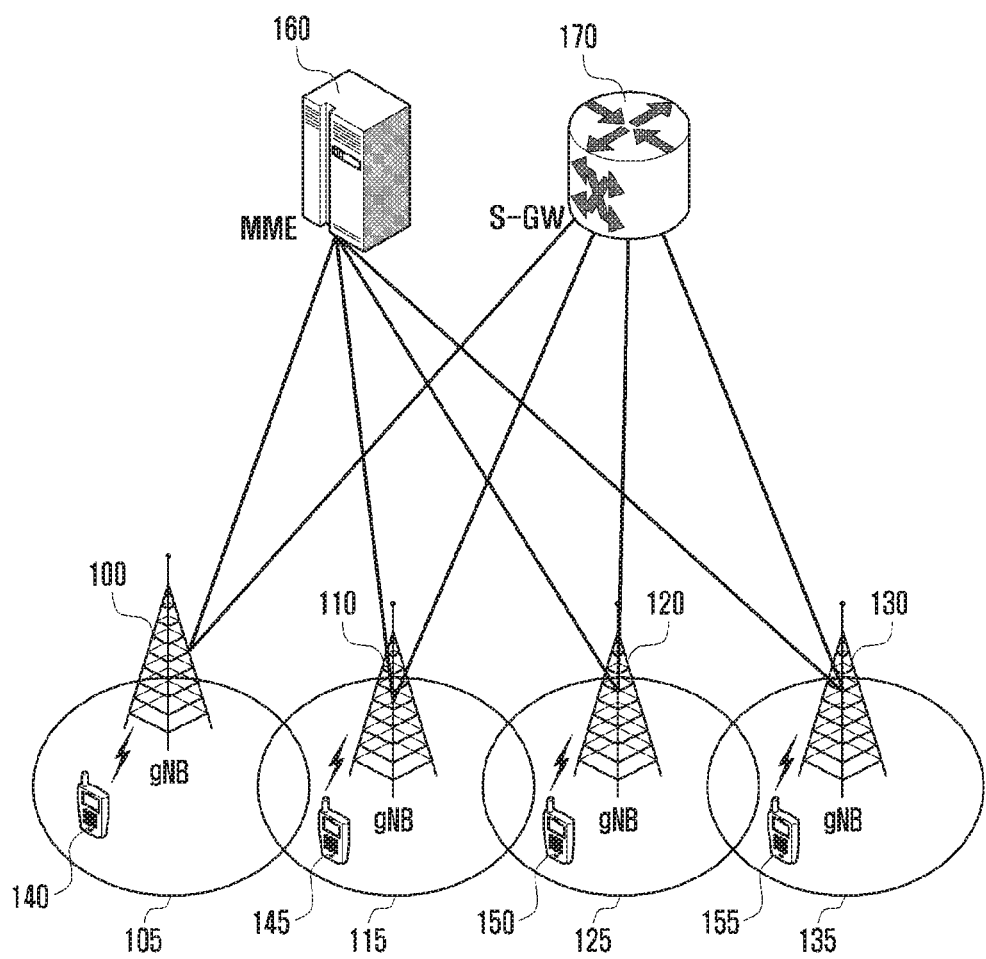
FIG. 1 is a diagram showing a schematic configuration of a communication system according to an embodiment of this specification.

Hereinafter, various embodiments of the present disclosure are described in detail with reference to the accompanying drawings. It is to be noted that the same reference numerals are used throughout the drawings to refer to the same elements. Furthermore, a detailed description of the known functions or elements that may make the gist of the present disclosure vague is omitted.

In this specification, in describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. The same reference numerals will be used to refer to the same or similar elements throughout the drawings.

In the present disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more CPUs within a device or a security multimedia card.

FIG. 1 is a diagram showing a schematic configuration of a mobile communication system according to an embodiment of this specification.

Referring to FIG. 1, the mobile communication system includes gNBs 100, 110, 120 and 130 (hereinafter a "base station") for operating a network. In one embodiment of the present disclosure, the mobile communication system may be 5G. The base stations 100, 110, 120 and 130 have pieces of coverage 105, 115, 125 and 135 capable of providing services, respectively. The base stations 100, 110, 120 and 130 are connected to user equipments (UEs) 140, 145, 150 and 155 through radio channels, and may provide wireless communication services to the UEs 140, 145, 150 and 155 with the types of coverage 105, 115, 125 and 135, respectively.

Since all of types of user traffic including real-time service, such as voice over IP (VoIP) service through a mobile communication Internet protocol, are served through a shared channel, there is a need for an apparatus for collecting and scheduling state information, such as the buffer state, available transmission power state and channel state of the UEs 140, 145, 150 and 155. This is taken charge by the base stations 100, 110, 120 and 130. In general, one base station controls multiple cells. An S-GW 170 is an apparatus providing a data bearer and creates or releases a data bearer under the control of an MME 160. The MME 160 is an apparatus responsible for various control functions in addition to a mobility management function for the UEs 140, 145, 150 and 155, and is connected to the multiple base stations 100, 110, 120 and 130.

Figure 2:
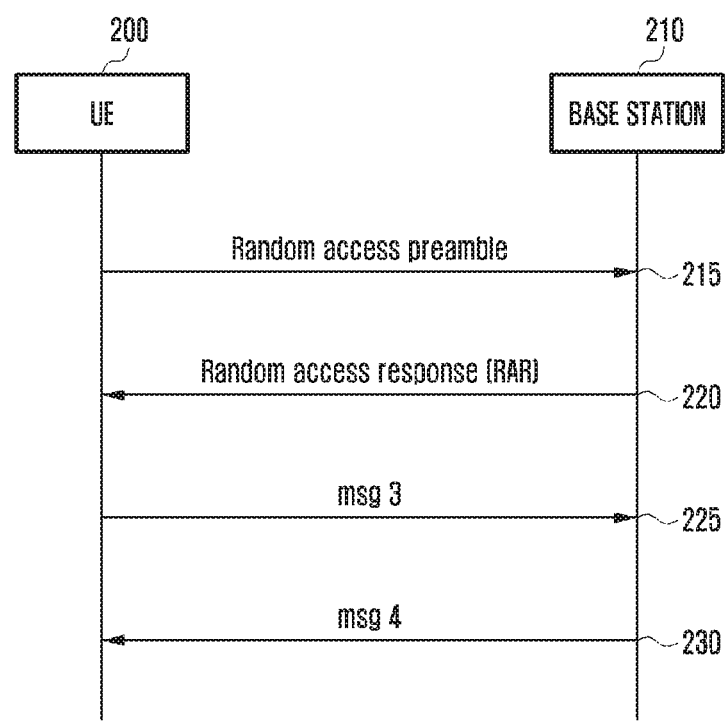
FIG. 2 is a diagram showing message transmission between a UE and a base station for random access in the LTE system.

FIG. 2 is a diagram showing message transmission between a UE and a base station for random access in the LTE system.

Referring to FIG. 2, signals may be transmitted and received between the UE 200 and the base station 210. The UE 200 may perform a procedure for random access in order to access the base station 210 as in the following description.

At operation 215, the UE 200 may transmit a signal, including a random access preamble, to the base station 210 in order to access the base station 210.

At operation 220, the base station 210 may transmit a random access response to the UE 210 in response to the received random access preamble. More specifically the base station 210 may transmit, to the UE 200, a random access response (hereinafter "RAR") message including at least one of the index of a random access preamble sequence detected by a network, a temporary cell radio-network temporary identifier (TC-RNTI) to be temporarily used between the UE 200 and the network, a timing advance value calculated using the random access preamble, and scheduling information of a resource to be used for message transmission by the UE 200 in a subsequent operation as a response to the detected random access attempt. The RAR may be transmitted along with down link control (DCI) information for receiving the RAR. The DCI may be scrambled with an RA-RNTI.

In this case, at a point of time at which a DL grant is transmitted in a DCI format for RAR transmission, the identification of the UE 200 that has transmitted the random access preamble is not performed. Accordingly, in order to not perform hybrid automatic repeat request (HARQ) transmission that requires the explicit identity of the UE, the DCI may be transmitted using a DCI format not including information related to an HARQ. For example, the RAR may be transmitted using a DCI format 1C. The DCI format 1C is a shortened DCI format, and does not include information related to an HARQ, but includes only minimum resource assignment information necessary to receive the RAR. The UE 200 may receive DCI scrambled with a corresponding RN-RNTI in a common search space.

Meanwhile, in LTE, a synchronous HARQ process is used for uplink transmission. That is, a subframe in which after an UL grant is transmitted, uplink data transmission is performed after 8 transmission time intervals (TTI) in FDD and uplink data transmission is performed after the UL grant according to a TDD configuration in TDD has been determined in the standard. Accordingly, for example, in the case of FDD, in all of types of uplink data transmission, an HARQ ID is automatically assigned in an 8TTI unit. The UE 200 that has been synchronized with the base station 210 implicitly recognizes the HARQ ID in the TTI to which the UL grant has been assigned. That is, the TTI in which the UL grant has been received indicates the HARQ ID allocable in the corresponding TTI. Accordingly, the UL grant of LTE does not explicitly provide notification of the HARQ ID. This is also applied to message transmission for random access, and does not specify an HARQ ID value when the UL grant of a message (Msg)3 transmitted in the RAR is assigned.

At operation 225, the UE 200 may transmit an Msg3 to the base station 210 based on the received RAR. More specifically when the UE 200 receives the RAR from the base station 210, the UE 200 may transmit a required message to the base station 210 using an uplink resource assigned in the RAR. The message may include identification information of the UE. If message transmission is performed using the uplink resource, an HARQ may be performed through a feedback information exchange with the base station.

At operation 230, the base station 210 may transmit a Msg4 to the UE 200 based on the Msg3. More specifically, the Msg4 may include information for contention-resolution. The Msg4 may be transmitted on a downlink shared channel. Accordingly, a contention between a plurality of UEs attempting to access a system can be solved using the same random access resource. The UE 200 may exchange subsequent information by performing a connection with the base station 210.

Even in a mobile communication system according to an embodiment of the present disclosure, a UE may access a network through a random access procedure 215, 220, 225, 230 similar to that of the conventional LTE, such as that shown in FIG. 2. However, the DCI format of the mobile communication standard may not include a DL grant not having HARQ transmission information like the DCI format 1C of LTE, and may be divided into B1/B2 only. The DCI format B1/B2 is a DL grant for data transmission, and thus always includes an HARQ ID for HARQ support and new data indicator (NDI) information for initial transmission/retransmission indication. Accordingly, in such a mobile communication standard, if a grant for an RAR is received by UEs having the same physical random access channel (RACH) preamble ID at the same time, call setup may not be properly performed because HARQ retransmission is attempted in the state in which an HARQ for which UE is unknown.

Figure 3:
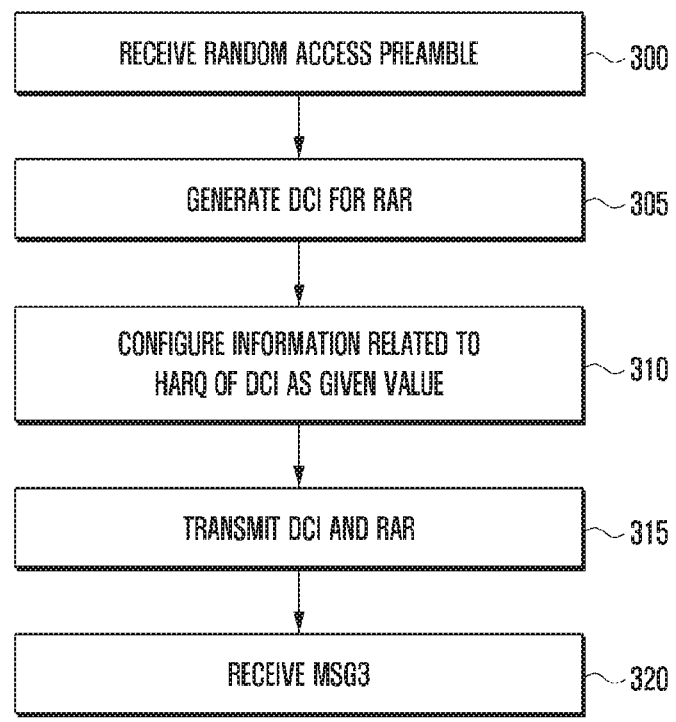
FIG. 3 is a flowchart illustrating a random access operation of a base station according to an embodiment of the present disclosure.

FIG. 3 is a flowchart illustrating a random access operation of a base station according to an embodiment of the present disclosure.

Referring to FIG. 3, in one embodiment, the base station may perform an access operation with a UE through signal transmission and reception.

At operation 300, the base station may receive a message, including a random access preamble for random access, from the UE. In one embodiment of the present disclosure, the random access preamble may be transmitted on a PRACH. To this end, the base station may broadcast information, regarding that which time-frequency resources can be used for random access preamble transmission (i.e., which resource is a PRACH), to UEs within a cell.

At operation 305, the base station may determine information to be included in an RAR to be transmitted to the UE and DCI information for RAR transmission based on the random access preamble received from the UE. In this case, the RAR may include at least one of the index of a random access preamble sequence detected by a network, a TC-RNTI to be temporarily used between the UE and the network, a timing advance value calculated based on the random access preamble, and scheduling information of a resource to be used by the UE for message transmission in a subsequent operation. The DCI for transmitting the RAR may be a DCI format B1 or a DCI format B2, but is not limited thereto. It is evident that downlink DCI for RAR reception may be used.

At operation 310, the base station may configure information related to an HARQ included in the DCI as a predetermined value. The information related to an HARQ included in the DCI may be at least one of an HARQ ID, new data indication (NDI), and a bit-mapping index for HARQ-ACK multiplexing. In one embodiment of the present disclosure, the predetermined value may be 0.

At operation 315, the base station may transmit, to the UE, the DCI in which the information related to an HARQ has been configured as the predetermined value and an RAR. In one embodiment, a DCI format for the RAR may be scrambled with a random access radio-network temporary identifier (RA-RNTI) and transmitted. The UE that has received the DCI scrambled with an RN-RNTI format may obtain the RAR by interpreting the DCI without considering the information related to an HARQ included in the corresponding DCI. In one embodiment, a UE may not perform an HARQ-related operation in an RAR transmission operation in which the identity of a UE is unclear because the UE is made to not take into consideration the information related to an HARQ configured as a predetermined value included in the DCI. In one embodiment, if the received DCI format has been scrambled with an RA-RNTI, the UE may interpret DCI without considering the information related to an HARQ included in the received DCI.

At operation 320, the base station may receive an Msg3 transmitted by the UE based on the RAR. In one embodiment, information related to an HARQ, included in the Msg3, may be configured as a predetermined value. The predetermined value may be 0. The Msg3 may include information about the identity of the UE.

In one embodiment, the base station may transmit an Msg4 to the UE based on the Msg3 from the UE. More specifically the Msg4 may include information for contention-resolution. The Msg4 may be transmitted on a downlink shared channel. Accordingly, a contention between a plurality of UEs attempting to access a system can be solved using the same random access resource. A UE may perform a connection with a base station, and exchange information.

Meanwhile, in the mobile communication standard, when the UL grant of an Msg3 transmitted in an RAR in the initial access process of a UE is assigned, it may have a structure in which an HARQ ID value has not been specified as in LTE. In the mobile communication standard, however, unlike in LTE, uplink transmission may operated according to an asynchronous HARQ like downlink transmission.

Accordingly, an HARQ ID may be assigned to an UL grant transmitted to a UE according to the DCI format A1/A2 for uplink data transmission, and a new data indicator (NDI)-related information indicative of new data transmission may be included in the UL grant. This indicates that any HARQ ID can be assigned in the TTI in which the UL grant has been received. In an UL transmission structure for mobile communication that requires an HARQ ID and NDI as described above, if the HARQ ID and the NDI are not specified based on the existing LTE structure, a UE that has received an UL grant through an Msg3 cannot obtain information related to the HARQ ID. It is necessary to define a corresponding operation.

Figure 4:
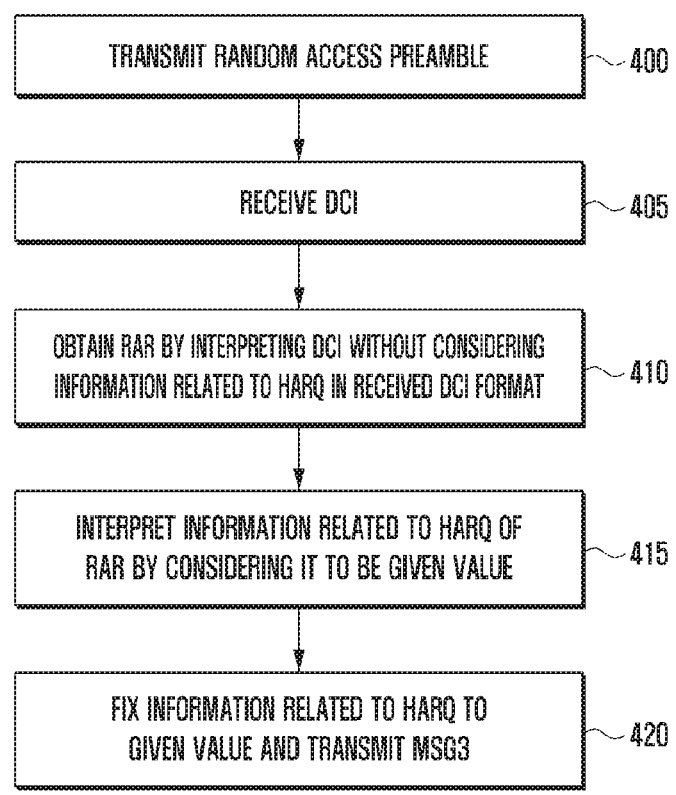
FIG. 4 is a flowchart illustrating a random access operation of a UE according to an embodiment of the present disclosure.

FIG. 4 is a flowchart illustrating a random access operation of a UE according to an embodiment of the present disclosure.

At operation 400, the UE may transmit a message, including a random access preamble, to a base station. More specifically, a signal including the random access preamble may be transmitted for a specific cause. In one embodiment, the specific cause may be at least one of setting up a radio link through initial access, setting up a radio link again after a radio link failure, forming uplink synchronization with a new cell through handover, and location measurement based on uplink measurement, for example. In accordance with one embodiment of the present disclosure, the random access preamble may be transmitted on a PRACH. To this end, the base station may broadcast information, regarding that which time-frequency resources can be used for random access preamble transmission (i.e., which resource is a PRACH), to UEs within a cell.

At operation 405, the UE may receive DCI from the base station in response to the message transmission including the random access preamble.

At operation 410, the UE may obtain the corresponding RAR in a downlink data channel by interpreting the DCI without considering information related to an HARQ included in the DCI received from the base station. In accordance with one embodiment, when a UE receives DCI scrambled with an RA-RNTI, the UE may obtain a corresponding RAR in a downlink data channel by interpreting the DCI without considering information related to an HARQ included in the received DCI. For example, the information related to an HARQ, included in the DCI scrambled with an RN-RNTI, may be at least one of an HARQ ID, new data indication (NDI), and a bit-mapping index for HARQ-ACK multiplexing. A UE may not perform an HARQ-related operation on a downlink data channel corresponding to DCI because it interprets the DCI without considering information related to an HARQ of the DCI.

At operation 415, the UE may obtain the RAR based on the DCI received from the base station, and may interpret the information related to an HARQ in an UL grant-related information for the transmission of the Msg3 included in the obtained RAR by considering the information to be a predetermined value. In one embodiment, the predetermined value may be 0. Accordingly, in a mobile communication system operating according to an asynchronous HARQ, although information related to an HARQ is not specified in an RAR, a UE considers the value of the corresponding information to be a predetermined value. Accordingly, an HARQ-related operation may be smoothly performed on an Msg3 transmitted by the UE. For example, although an HARQ process ID is not explicitly indicated in an UL grant for the Msg3 of an RAR, a UE operates by considering HARQ ID=0 and NDI=0, thereby being capable of removing the uncertainty of an operation.

At operation 420, the UE may configure the information related to an HARQ, included in the Msg3, as a predetermined value based on the obtained RAR, and may transmit the Msg3. For example, the UE may transmit the Msg3 to the base station using an uplink resource assigned in the RAR. In this case, the Msg3 may include information about the identity of the UE. When an Msg4 is received from the base station in response to the transmission of the Msg3, a contention between a plurality of UEs attempting to access a system can be solved using the same random access resource, and a UE may perform a connection with the base station, and exchange information.

Figure 5:
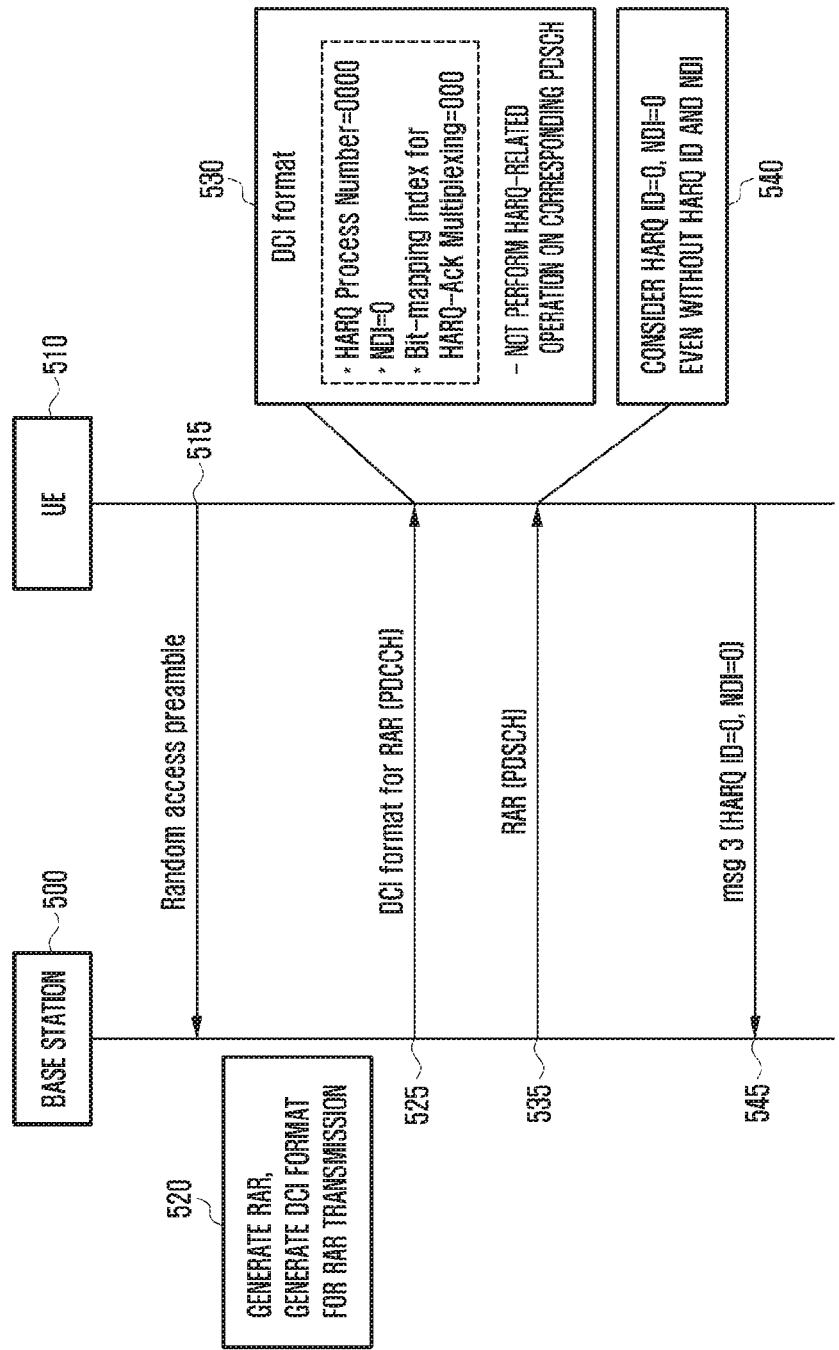
FIG. 5 is a diagram showing message transmission between a UE and a base station for random access according to an embodiment of the present disclosure.

FIG. 5 is a diagram showing message transmission between a UE and a base station for random access according to an embodiment of the present disclosure.

Referring to FIG. 5, the UE 510 and the base station 500 may transmit and receive signals. The UE 510 may perform a procedure for random access as in the following description in order to access the base station 500.

At operation 515, the UE 510 may transmit a signal, including a random access preamble, to the base station 500. More specifically, the signal including the random access preamble may be transmitted for a specific cause. The specific cause may be at least one of setting up a radio link through initial access, setting up a radio link again after a radio link failure, forming uplink synchronization with a new cell through handover, and location measurement based on uplink measurement, for example.

In one embodiment of the present disclosure, the signal including the random access preamble may be transmitted on a PRACH. To this end, the base station 500 broadcasts information, regarding that which time-frequency resources can be used for random access preamble transmission (i.e., which resource is a PRACH), to the UE 510 within a cell.

At operation 520, after receiving the random access preamble from the UE 510, the base station 500 may determine information to be included in an RAR to be transmitted to the UE and DCI information for RAR transmission based on the received random access preamble. In this case, the RAR may include at least one of the index of a random access preamble sequence detected by a network, a TC-RNTI to be temporarily used between the UE 510 and the network, a timing advance value calculated based on the random access preamble, and scheduling information of a resource to be used by the UE 510 for message transmission in a subsequent operation. A DCI format for transmitting the RAR may be a DCI format B1 or a DCI format B2, but is not limited thereto. It is evident that downlink DCI for RAR reception may be used.

When DCI to be transmitted to the UE 510 is determined, the base station 500 may configure information related to an HARQ, included in the DCI, as a predetermined value. The information related to an HARQ included in the DCI may be at least one of an HARQ ID, new data indication (NDI), and a bit-mapping index for HARQ-ACK multiplexing. In one embodiment of the present disclosure, the predetermined value may be 0.

At operation 525, the base station 500 may transmit a DCI format in which the information related to an HARQ has been configured as the predetermined value to the UE 510 on a downlink control channel.

At operation 535, the base station 500 may transmit the determined RAR to the UE 510 on a downlink data channel using the DCI format. In one embodiment of the present disclosure, the DCI format for transmitting the RAR may be scrambled with a random access radio-network temporary identifier (RA-RNTI) and transmitted.

At operation 530, the UE 510 may interpret the DCI without considering the information related to an HARQ included in the received DCI, and may not perform an HARQ-related operation on the corresponding downlink data channel. In one embodiment, when the UE 510 receives DCI scrambled with an RN-RNTI, it may obtain a corresponding RAR in a downlink data channel by interpreting the DCI without considering information related to an HARQ included in the received DCI. In an embodiment of the present disclosure, the UE 510 may not perform an HARQ-related operation in an RAR transmission operation in which the identity of a UE is unclear because the UE 510 does not take into consideration information related to an HARQ included in DCI, which is fixed to a predetermined value, scrambled with an RN-RNTI and transmitted.

At operation 540, the UE 510 obtains a corresponding RAR in a downlink data channel by interpreting the DCI format, and interprets information related to an HARQ included in an UL grant for the transmission of an Msg3 included in the obtained RAR by considering the information as a predetermined value. For example, the predetermined value may be 0. Accordingly, in a mobile communication system operating according to an asynchronous HARQ, although information related to an HARQ has not been specified in an RAR, the UE 510 considers the value of the corresponding information as a predetermined value. Accordingly, an HARQ-related operation may be smoothly performed on the Msg3 transmitted by the UE. For example, although an HARQ process ID is not explicitly indicated in an UL grant for an Msg3 included in an RAR, the UE 510 operates by considering HARQ ID=0 and NDI=0, thereby being capable of removing the uncertainty of an operation.

At operation 545, the UE 510 may configure information related to an HARQ as a predetermined value based on an UL grant included in the RAR received from the base station, and may transmit an Msg3. The Msg3 may be transmitted to the base station using an uplink resource assigned in the RAR. In this case, the Msg3 may include information about the identity of the UE. When an Msg4 is received from the base station in response to the transmission of the Msg3, a contention between a plurality of UEs attempting to access a system can be solved using the same random access resource, and the UE 510 may perform a connection with the base station 500 and then may exchange information.

Meanwhile, in accordance with one embodiment of the present disclosure, an RAR transmitted by a base station in response to a signal including a random access preamble, received from a UE, may include information that is necessary for a DCI format as an UL grant for common uplink data, but is not necessary for an RAR. For example, the unnecessary information may include at least one of beam switch indication, an uplink dual PCRS, an HARQ ID and NDI. In the existing LTE, the unnecessary information may be deleted from the DCI format 1C and an RAR may be transmitted. In a mobile communication system according to an embodiment of the present disclosure, unnecessary information is not deleted from an RAR and may be transmitted to a UE.

Figure 6:
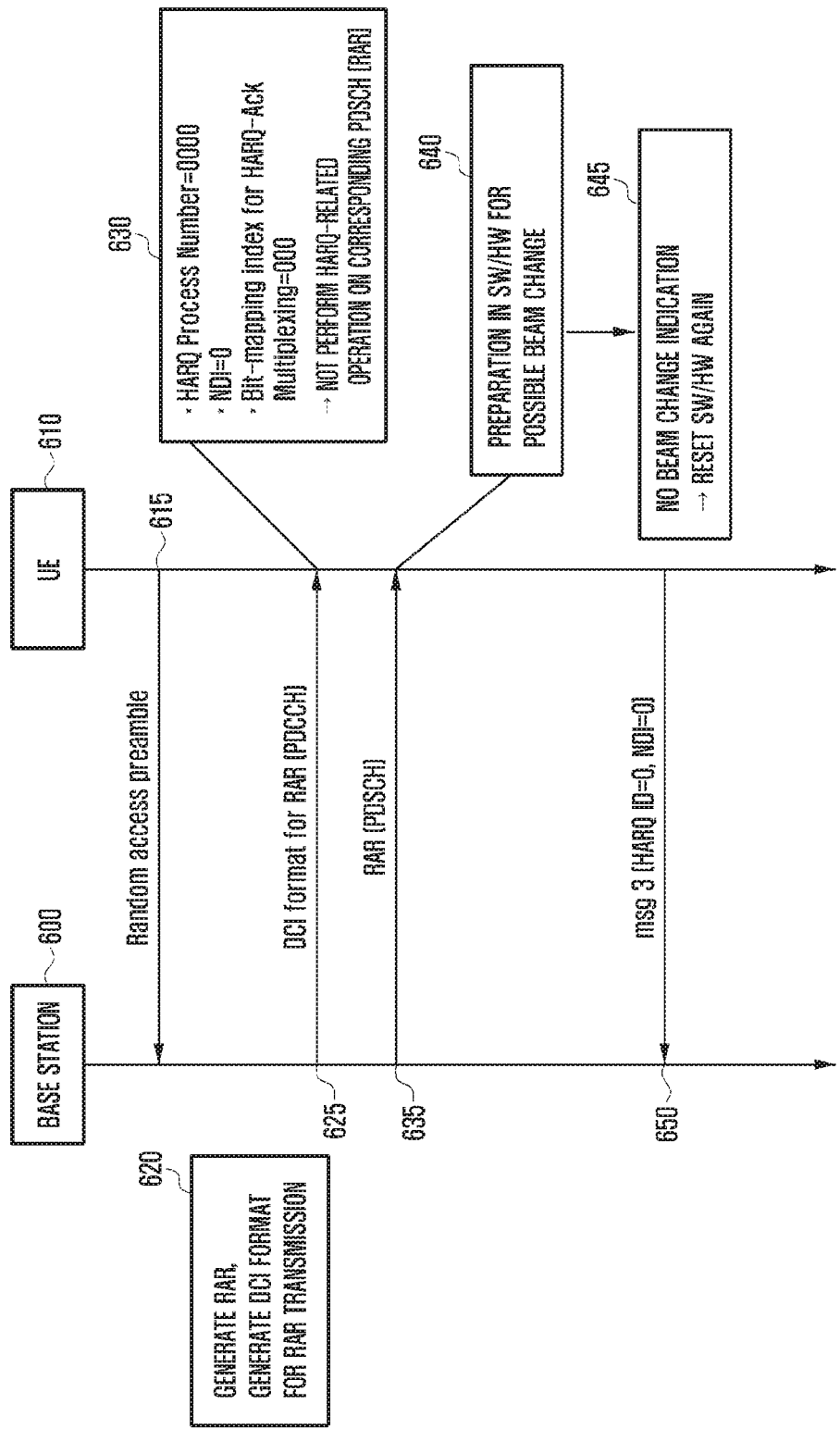
FIG. 6 shows operations of a base station and a UE when contents not transmitted in the UL grant of an RAR have not been specified as being not expected by a UE according to one embodiment of the present disclosure.

FIG. 6 shows operations of a base station and a UE when contents not transmitted in the UL grant of an RAR have not been specified as being not expected by a UE according to one embodiment of the present disclosure.

Referring to FIG. 6, in one embodiment, the base station 600 may perform a random access operation along with the UE 610 through signal transmission and reception.

At operation 615, the UE 610 may transmit a signal including, a random access preamble, to the base station 600. More specifically, the signal including the random access preamble may be transmitted for a specific cause. The specific cause may be at least one of setting up a radio link through initial access, setting up a radio link again after a radio link failure, forming uplink synchronization with a new cell through handover, and location measurement based on uplink measurement, for example.

In one embodiment of the present disclosure, the signal including the random access preamble may be transmitted on a PRACH. To this end, the base station 600 broadcasts which time-frequency resource can be used for random access preamble transmission (i.e., which resource is a PRACH) to the UE 610 within a cell.

At operation 620, after receiving the signal including the random access preamble from the UE 610, the base station 600 may determine information to be included in an RAR to be transmitted to the UE and DCI information for RAR transmission based on the received random access preamble. In this case, the RAR may include at least one of the index of a random access preamble sequence detected by a network, a TC-RNTI to be temporarily used between the UE 610 and the network, a timing advance value calculated based on the random access preamble, and scheduling information of a resource to be used by the UE 610 for message transmission in a subsequent operation. A DCI format for transmitting the RAR may be a DCI format B1 or a DCI format B2, but is not limited thereto. It is evident that downlink DCI for RAR reception may be used. When the DCI to be transmitted to the UE 610 is determined, the base station 600 may configure information related to an HARQ included in the DCI as a predetermined value. The information related to an HARQ included in the DCI may be at least one of an HARQ ID, new data indication (NDI), and a bit-mapping index for HARQ-ACK multiplexing. In one embodiment of the present disclosure, the predetermined value may be 0.

At operation 625, the base station 600 may transmit, to the UE 610, a DCI format in which the information related to an HARQ has been configured as the predetermined value on a downlink control channel. In one embodiment, the DCI format for transmitting the RAR may be scrambled with an RA-RNTI and transmitted.

At operation 635, the base station 600 may transmit the determined RAR to the UE 610 on a downlink data channel using the DCI format.

At operation 630, the UE may obtain the corresponding RAR on the downlink data channel by interpreting the DCI without considering the information related to an HARQ included in the received DCI. In one embodiment, when the UE 610 receives the DCI scrambled with an RN-RNTI from the base station, it may obtain the corresponding RAR on the downlink data channel by interpreting the DCI without considering the information related to an HARQ included in the received DCI. In one embodiment, the information related to the HARQ of the DCI scrambled with an RN-RNTI may be at least one of an HARQ ID, new data indication (NDI), and a bit-mapping index for HARQ-ACK multiplexing. The UE may not perform an HARQ-related operation on a downlink data channel corresponding to the DCI because it interprets the DCI without considering the information related to an HARQ included in the DCI.

Meanwhile, in one embodiment, the RAR may include at least one of the index of a random access preamble sequence detected by a network, a TC-RNTI to be temporarily used between the UE 610 and the network, a timing advance value calculated using the random access preamble, and scheduling information of a resource to be used by the UE 610 for message transmission in a subsequent operation. However, the RAR may include information that is necessary for a DCI format as an UL grant for common uplink data, but is not necessary for an RAR. For example, the unnecessary information may include at least one of a beam switch indication, an uplink dual PCRS, an HARQ ID, and NDI.

In accordance with one embodiment of the present disclosure, the UE may implicitly assume a corresponding operation with respect to information that is preset in the DCI format, but is not present in the UL grant of an RAR.

At operation 640, the UE 610 may implicitly prepare a required operation in software and hardware for a beam change that may be present when the RAR is received from the base station 600 with respect to the beam switch indication of information that is present in the DCI format, but is not present in the UL grant of the RAR. Furthermore, in one embodiment, when information indicative of a beam change is received, the UE may perform an operation for a beam change based on the information, and may select a beam to be changed based on at least one of obtained beam-related measurement information and the information indicative of the beam change.

At operation 645, the UE 610 may reset the software and the hardware when beam switch indication is not present in the RAR.

At operation 650, the UE 610 may configure information related to an HARQ as a predetermined value based on the UL grant of the RAR received from the base station 600, and may transmit an Msg3. The UE may transmit the Msg3 to the base station using an uplink resource assigned in the RAR. In this case, the Msg3 may include the identity of the UE 610. When the UE 610 receives an Msg4 from the base station in response to the transmission of the Msg3, a contention between a plurality of UEs attempting to access a system can be solved using the same random access resource, and the UE 610 may perform a connection with the base station 600 and exchange information.

Figure 7:
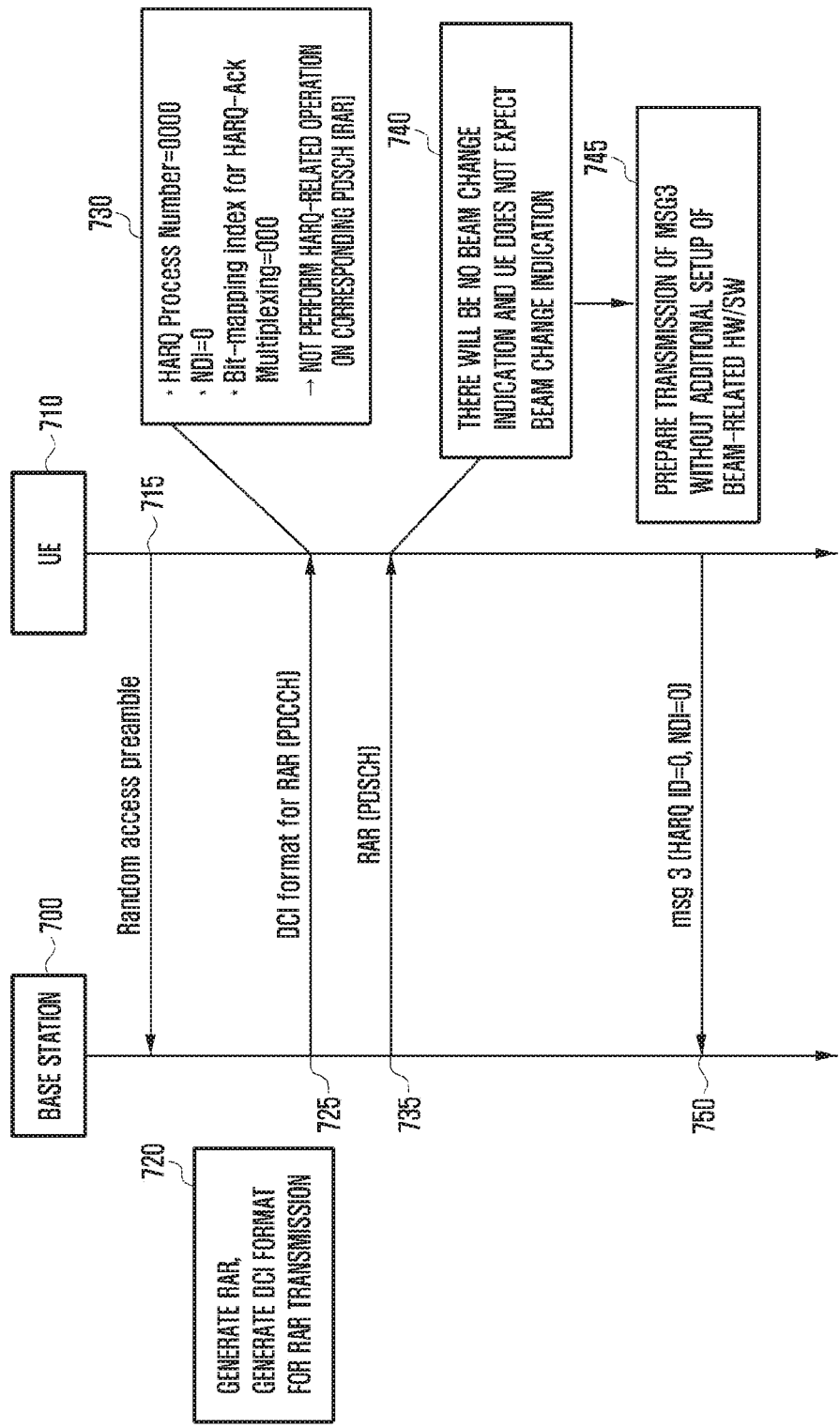
FIG. 7 shows operations of a base station and a UE when contents not transmitted in the UL grant of an RAR have been specified as being not expected by a UE according to one embodiment of the present disclosure.

FIG. 7 shows operations of a base station and a UE when an operation of the UE, such as that in an embodiment of this specification, is assumed with respect to contents not included in the UL grant of an RAR according to one embodiment of the present disclosure.

Referring to FIG. 7, in one embodiment, the base station 700 may perform a random access operation along with the UE 710 through signal transmission and reception.

At operation 715, the UE 710 may transmit, to the base station 700, a signal including a random access preamble. More specifically, the signal including the random access preamble may be transmitted for a specific cause. The specific cause may be at least one of setting up a radio link through initial access, setting up a radio link again after a radio link failure, forming uplink synchronization with a new cell through handover, and location measurement based on uplink measurement, for example.

In one embodiment of the present disclosure, the signal including the random access preamble may be transmitted on a PRACH. To this end, the base station 700 broadcasts information, regarding that which time-frequency resources can be used for random access preamble transmission (i.e., which resource is a PRACH), to the UE 710 within a cell.

At operation 720, after receiving the signal including the random access preamble from the UE 710, the base station 700 may determine information to be included in an RAR to be transmitted to the UE and DCI information for RAR transmission based on the received random access preamble. In this case, the RAR may include at least one of the index of a random access preamble sequence detected by a network, a TC-RNTI to be temporarily used between the UE 710 and the network, a timing advance value calculated based on the random access preamble, and scheduling information of a resource to be used by the UE 710 for message transmission in a subsequent operation. A DCI format for transmitting the RAR may be a DCI format B1 or a DCI format B2, but is not limited thereto. It is evident that downlink DCI for RAR reception may be used. When the DCI to be transmitted to the UE 710 is determined, the base station 700 may configure information related to an HARQ included in the DCI as a predetermined value. The information related to an HARQ included in the DCI may be at least one of an HARQ ID, new data indication (NDI), and a bit-mapping index for HARQ-ACK multiplexing. In one embodiment of the present disclosure, the predetermined value may be 0.

At operation 725, the base station 700 may transmit, to the UE 710, a DCI format in which the information related to an HARQ has been configured as the predetermined value on a downlink control channel. In one embodiment, the DCI format for transmitting the RAR may be scrambled with an RA-RNTI and transmitted.

At operation 735, the base station 700 may transmit the determined RAR to the UE 710 on a downlink data channel using the DCI format.

At operation 730, the UE may obtain the corresponding RAR on a downlink data channel by interpreting the DCI without considering the information related to an HARQ included in the received DCI. In one embodiment, if a DCI format received from the base station has been scrambled with an RA-RNTI, the UE 710 may obtain a corresponding RAR on a downlink data channel by interpreting DCI without considering information related to an HARQ included in the received DCI. In one embodiment, the information related to the HARQ of the DCI format may be at least one of an HARQ ID, new data indication (NDI), and a bit-mapping index for HARQ-ACK multiplexing. The UE may not perform an HARQ-related operation on a downlink data channel corresponding to the DCI by interpreting the DCI without considering the information related to an HARQ included in the DCI.

Meanwhile, in one embodiment, the RAR may include at least one of the index of a random access preamble sequence detected by a network, a TC-RNTI to be temporarily used between the UE 710 and the network, a timing advance value calculated using the random access preamble, and scheduling information of a resource to be used by the UE 710 for message transmission in a subsequent operation. However, the RAR may include information that is necessary for a DCI format as an UL grant for common uplink data, but is not necessary for an RAR. For example, the unnecessary information may include at least one of a beam switch indication, an uplink dual PCRS, an HARQ ID, and NDI.

In accordance with one embodiment of the present disclosure, it may be explicitly defined that the UE does not perform a corresponding operation with respect to information that includes the DCI format for common uplink data, but not includes the UL grant of an RAR.

At operation 740, it may be explicitly defined that the UE 710 considers beam switch indication information to be not present in a received RAR with respect to the beam switch indication of information that is present in the DCI format, but is not present in the UL grant of an RAR.

At operation 745, the UE may prepare the transmission of an Msg3 without additional setup of software and hardware related to a beam.

At operation 750, the UE 710 may configure information related to an HARQ as a predetermined value based on the UL grant of the RAR received from the base station 700, and may transmit the Msg3. The UE may transmit the Msg3 to the base station using an uplink resource assigned in the RAR. In this case, the Msg3 may include the identity of the UE. When an Msg4 is received from the base station in response to the transmission of the Msg3, a contention between a plurality of UEs attempting to access a system can be solved using the same random access resource, and the UE 710 may perform a connection with the base station 700 and then exchange information.

Figure 8:
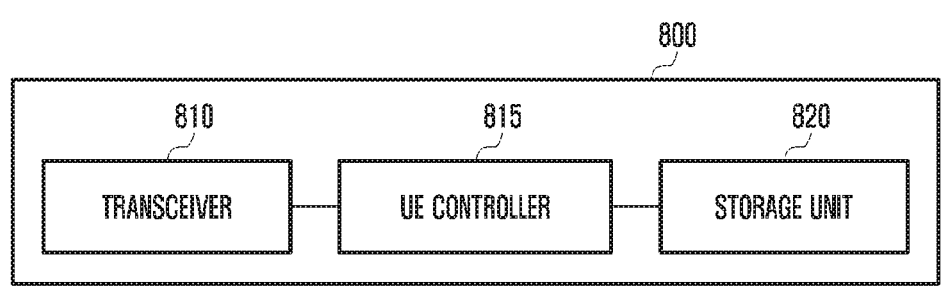
FIG. 8 is a diagram showing a UE according to an embodiment of the present disclosure.

FIG. 8 is a diagram showing a UE according to an embodiment of the present disclosure.

Referring to FIG. 8, the UE of an embodiment may include a transceiver 810, a UE controller 815 and a memory 820.

The transceiver 810 may transmit and receive signals to and from a base station and a different entity. In accordance with one embodiment of the present disclosure, the transceiver 810 may transmit, to a base station, a signal, including a random access preamble for random access, and an Msg3 in response to an RAR received from the base station, and may receive an RAR and an Msg4 from the base station.

The memory 820 may store at least one of information related to the UE and information transmitted and received through the transceiver 810. In accordance with one embodiment of the present disclosure, the memory 820 may store information necessary for an HARQ operation.

The UE controller 815 may be connected to the transceiver and the memory, may control an operation of the UE, and may control the entire UE so that it can perform the operations related to the UE and described in the embodiments. The UE controller 815 may include at least one processor.

Figure 9:
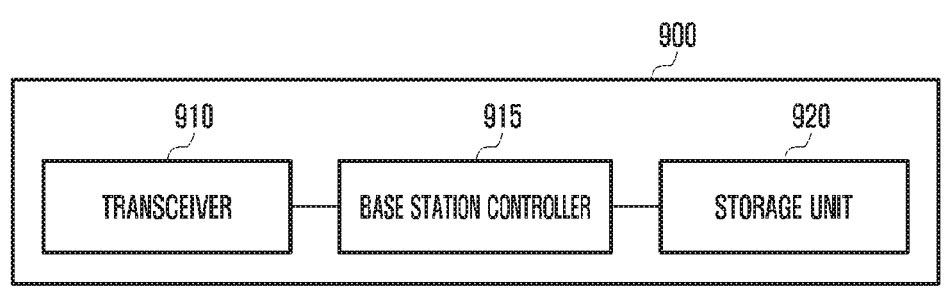
FIG. 9 is a diagram showing a base station according to an embodiment of the present disclosure.

FIG. 9 is a diagram showing a base station according to an embodiment of the present disclosure.

Referring to FIG. 9, the UE of an embodiment may include a transceiver 910, a base station controller 915 and a memory 920.

The transceiver 910 may transmit and receive signals to and from a UE and a different entity. In accordance with one embodiment of the present disclosure, the transceiver 910 may receive, from a UE, a signal including a random access preamble for random access and an Msg3 received from the UE in response to an RAR transmitted to the UE, and may transmit an RAR and an Msg4 to the UE.

The memory 920 may store at least one of information related to the base station and information transmitted and received through the transceiver 910. In accordance with one embodiment of the present disclosure, the memory 920 may store information necessary for an HARQ operation.

The base station controller 915 may be connected to the transceiver and the memory, may control an operation of the base station, and may control the entire base station so that it can perform the operations related to the base station and described in the embodiments. The base station controller 915 may include at least one processor.

Meanwhile, the preferred embodiments of the present disclosure have been disclosed in this specification and drawings. Although specific terms have been used, they are used in common meanings in order to easily describe the technical contents of the present disclosure and to help understanding of the present disclosure, but are not intended to limit the scope of the present disclosure. It is evident to a person having ordinary skill in the art to which the present disclosure pertains that other modified examples based on the technical spirit of the present disclosure are possible in addition to the disclosed embodiments.

What is claimed is:

1. A communication method by a base station in a wireless communication system, comprising:
receiving, from a terminal, a random access message;
determining a response message in response to the random access message and downlink control information related to the response message, the downlink control information including given information configured as a preset value;
transmitting, to the terminal, the determined response message and the determined downlink control information; and
receiving, from the terminal, a message including identification information of the terminal without considering the given information configured as the preset value.

2. The communication method of claim 1, wherein:
the given information is at least one of a hybrid automatic retransmission request (HARQ) ID, a new data indication (NDI), a bit-mapping index for HARQ-ACK multiplexing, a beam switch indication or an uplink dual phase noise compensation reference signal (PCRS), and
if the downlink control information is scrambled with a random access-radio-network temporary identifier (RA-RNTI), the given information included in the downlink control information is configured as the preset value.

3. The communication method of claim 1, wherein the preset value is 0.

4. A communication method by a terminal in a wireless communication system, comprising:
transmitting, to a base station, a message for random access;
receiving, from the base station, downlink control information corresponding to the message for random access;
receiving a response message by interpreting the downlink control information without considering a value of given information included in the downlink control information; and
transmitting, to the base station, a terminal identification message based on the response message,
wherein the given information included in the terminal identification message is configured as a preset value.

5. The communication method of claim 4, wherein, if the downlink control information has been scrambled with a random access-radio-network temporary identifier (RA-RNTI), the downlink control information is interpreted without considering the preset value of the given information included in the downlink control information.

6. The communication method of claim 4, wherein the given information included in the downlink control information and the given information included in the terminal identification message comprise at least one of an hybrid automatic retransmission request (HARQ) identifier (ID), a new data indication (NDI), a bit-mapping index for HARQ-ACK multiplexing, a beam switch indication, or an uplink dual phase noise compensation reference signal (PCRS).

7. The communication method of claim 4, wherein the preset value is 0.

8. A base station for performing communication in a wireless communication system, the base station comprising:
a transceiver configured to transmit and receive signals; and
at least one processor configured to:
control the transceiver to receive, from a terminal, a random access message,
determine a response message in response to the random access message and downlink control information related to the response message, the downlink control information including given information configured as a preset value,
control the transceiver to transmit, to the terminal, the determined response message and the determined downlink control information, and
control the transceiver to receive, from the terminal, a message including identification information of the terminal without considering the given information configured as the preset value.

9. The base station of claim 8, wherein:
the given information is at least one of a hybrid automatic retransmission request (HARQ identifier (ID), a new data indication (NDI), a bit-mapping index for HARQ-ACK multiplexing, a beam switch indication or an uplink dual phase noise compensation reference signal (PCRS), and
if the downlink control information is scrambled with a random access-radio-network temporary identifier (RA-RNTI), the given information included in the downlink control information is configured as the preset value.

10. The base station of claim 8, wherein the preset value is 0.

11. A terminal for performing communication in a wireless communication system, the terminal comprising:
a transceiver configured to transmit and receive signals; and
at least one processor configured to:
control the transceiver to transmit, to a base station, a message for random access,
control the transceiver to receive, from the base station, downlink control information corresponding to the message for random access,
control the transceiver to receive a response message by interpreting the downlink control information without considering a value of given information included in the downlink control information, and
control the transceiver to transmit, to the base station, a terminal identification message based on the response message,
wherein the given information included in the terminal identification message is configured as a preset value.

12. The terminal of claim 11, wherein:
the given information included in the downlink control information and the given information included in the terminal identification message comprise at least one of an hybrid automatic retransmission request (HARQ) identifier (ID), a new data indication (NDI), a bit-mapping index for HARQ-ACK multiplexing, a beam switch indication, or an uplink dual phase noise compensation reference signal (PCRS), and if the downlink control information has been scrambled with a random access-radio-network temporary identifier (RA-RNTI), the downlink control information is interpreted without considering the preset value of the given information included in the downlink control information.

13. The terminal of claim 11, wherein the preset value is 0.

* * * * *